United States Patent Office 2,714,068
Patented July 26, 1955

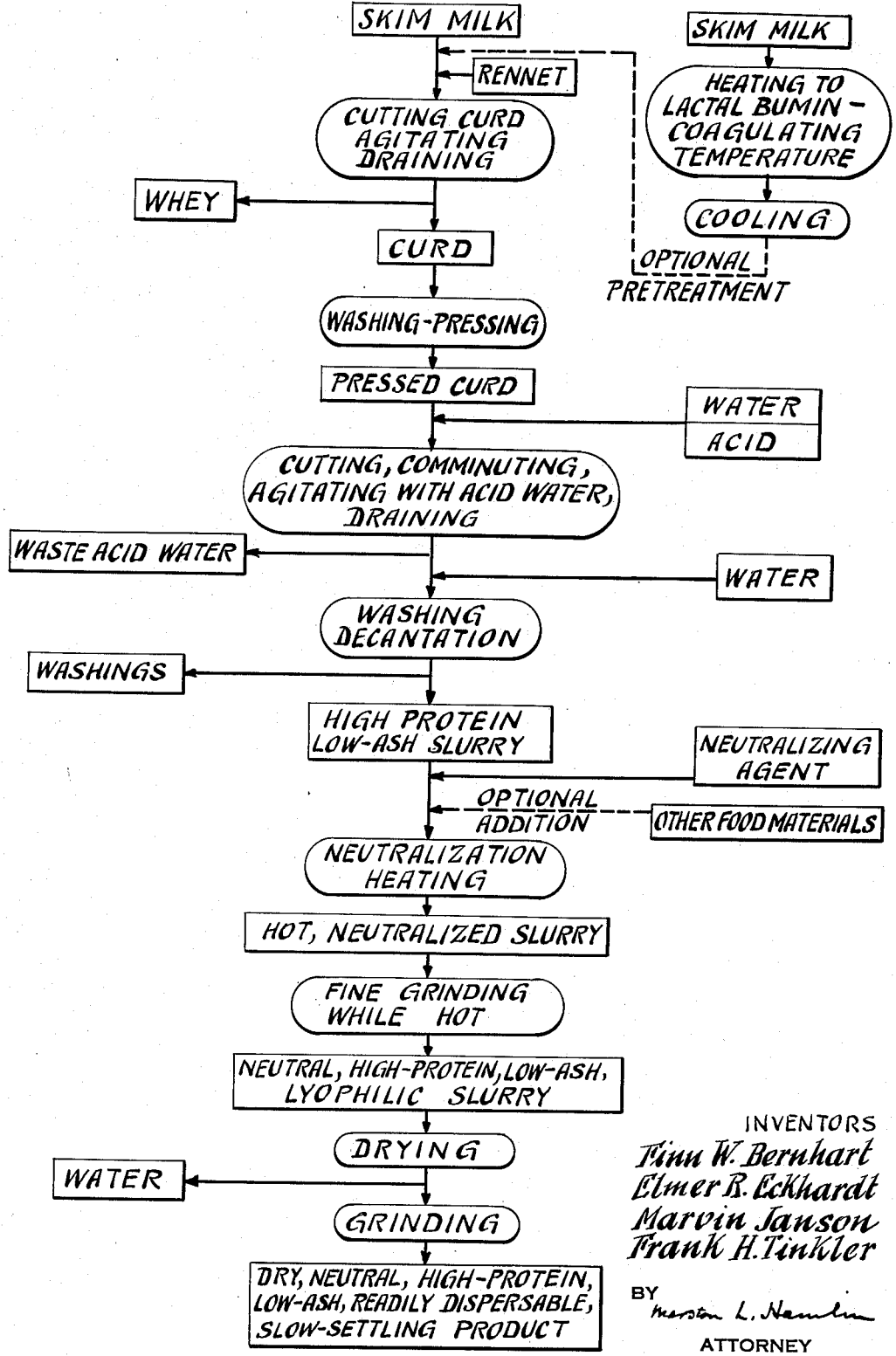

2,714,068

DIACASEIN AND PROCESS FOR ITS MANUFACTURE

Finn W. Bernhart, Holt, and Elmer R. Eckhardt and Marvin H. Janson, Mason, Mich., and Frank H. Tinkler, Silver Spring, Md., assignors, by mesne assignments, to American Home Products Corporation, New York, N. Y., a corporation of Delaware Application September 25, 1952, Serial No. 311,444

10 Claims. (Cl. 99—20)

This invention relates to a new derivative of casein, its preparation and its use in nutritional and dietetic compositions.

Casein is the characteristic phosphoprotein of milk. The word "casein" appears in the technical literature in several related senses and usage has varied in the last few decades; usage has also been different in Great Britain and the United States. Today, however, both American and British usage have become more uniform. "Casein" is used generically to designate the phosphoprotein in milk which is coagulable by acid and by rennet and uncoagulable by heat, and in this sense includes its various colloidal modifications and salts, such as the casein in cheese, acid casein, and the like; "casein" is also used in a specific sense limited to the phosphoprotein in its native form as contained in milk. Following customary practice, the term "casein" will be used in this specification in both its general and specific senses, the meaning being clear in each case from the context.

The term "paracasein" denotes the insoluble form of casein formed by the action of rennet on milk casein, as found for example in cheese. "Acid casein" designates a form of casein resulting from the acid coagulation of milk casein at the isoelectric point; after drying it is soluble in water at neutral pH values.

Casein in its various forms has many important uses, nutritional and industrial. As a nutritional protein it is particularly valuable as it is a biologically complete protein. Aside from its consumption in milk, enormous quantities are consumed as cheese. Because of its ready availability and the ease with which it may be isolated and purified to various degrees, casein finds extensive use in dietetics, both in animal experimentation and in human therapy. In a highly purified form it affords a source of protein of constant composition and controlled amino acid content.

In human dietetics casein is used in the form of paracasein, i. e. casein that has been coagulated by rennet and further worked up in one of several available ways, or in the form of acid casein. For therapeutic use it is furnished as a dry powder which is intended to be dispersed in a suitable liquid medium before ingestion. Ordinarily paracasein is unpleasant in taste and odor, high in ash content; it is insoluble in water at a neutral pH, and even though ground to an impalpable powder, it will not remain suspended in water and gives a gritty sensation when taken by mouth.

A soluble modification of rennet-coagulated casein is disclosed in U. S. Patent 2,320,165, to Atwood et al. A process is described for manufacturing casein (paracasein) by precipitating the casein from milk with rennet in a quiescent state to form a clot, breaking the clot and acidulating the casein mixture immediately after precipitation and prior to separating the casein from the whey in which it is precipitated, and separating the casein therefrom.

This casein product is much more soluble and has a much lower ash content as compared to the usual paracasein. If the dry material is suspended in water and the pH raised to the range of 6.5–7.2 which is most acceptable from a taste standpoint it goes almost entirely in solution.

The manufacture of acid casein is more difficult than that of paracasein by rennet, as the precipitate formed is very fine and does not settle well. Special equipment and trained operators not usually found in cheese factories are therefore required to first isolate the protein. It is difficult though possible to wash the acid protein to remove impurities and taste and odor principles.

The various soluble prior art products which we have examined appear to have serious drawbacks for dietetic use.

We have found in experimenting with them that their solubility in water results in a repugnant "gluey" taste when they are suspended in powder form in water. Furthermore, these soluble products do not disperse readily in aqueous media owing to the fact that when the surfaces of the powder particles are wet, a cementitious layer is formed which prevents penetration of water to the center of the particles. Since these surfaces are sticky, the particles tend to agglomerate into masses which are difficult to break up.

From the facts summarized above it is clear that neither the hitherto available insoluble or highly soluble forms of casein are altogether satisfactory dietary materials for human use, although in the absence of more desirable materials such use has been made of them. In other words, neither highly insoluble protein lacking lyophilic properties or highly soluble protein are desirable in a food product where taste and ease of stirring into water or other liquids are important factors.

It is one object of our invention to provide an improved casein product for human dietary use.

It is another object of our invention to provide such a product which is readily dispersible in water or other aqueous media, is slow settling when dispersed, is nearly tasteless, and is free of a gluey character.

It is a further object of our invention to provide such a product of low mineral content or of controlled mineral content so that it is adapted to serve as the protein constituent of a "salt-free" diet.

It is a still further object of our invention to provide such a product which may in large part be manufactured in the conventional equipment of a cheese factory.

Other objects and advantages of our invention will be apparent to those skilled in the art from the following disclosure.

The chief requirements of such a product are the following:

1. It must be incompletely soluble but capable of forming a stable suspension in water. By virtue of the relative insolubility no difficulty with a "gluey" taste sensation would be noticed. A stable suspension is required to allow convenient administration by mouth and for tube feeding.

2. It must be free of taste and odor.

3. It should preferably be capable of being roll-dried.

4. It should be capable of being produced with a desired controlled mineral content, especially a low sodium content, thus allowing the material to be used for therapeutic diets requiring a low sodium intake.

5. It should be capable of preparation in ordinary cheese plant equipment.

As far as we are aware, none of the known types of casein or paracasein meet these requirements.

According to our invention we have developed a new modification of casein and a method of making it. We call this new product "diacasein," utilizing the Greek prefix "dia-" in the sense of "between," since our product has properties intermediate those of native milk casein and paracasein as disclosed below.

Our process of making diacasein can be carried out in conventional equipment with simple control; equipment available in a cheese factory can largely be used. While some of the process steps are reminiscent of cheese-making operations, certain critically important steps, new in this relationship, have been introduced, and the combination of steps constituting our process is new and produces a new, unexpected and highly useful result. Furthermore a simple modification of our process permits the inclusion with the diacasein of whey lactalbumin, thus providing a product containing substantially all the available milk proteins.

The production of paracasein from milk by the addition of an enzyme such as rennet has the desirable property of being accomplished without chemical control and with usual cheese makers' equipment because the firm tough curd that is produced allows drainage of the whey without the necessity of decantation or filtration. As pointed out above, however, paracasein has not in the past been suitable for therapeutic dietetic use for humans because of its objectionable taste and odor, and because, when dried by the usual methods, it is insoluble in water and even though very finely ground, settles out rapidly from water. In our process we have taken advantage in the early steps of the favorable properties of paracasein from the production point of view and have then introduced steps resulting in the production of diacasein.

According to our process we treat skim milk in the usual way with rennet to coagulate the casein; the curd is then cut and stirred, the whey drained off and the curd washed and pressed as in conventional cheese manufacture. In one desirable embodiment of our invention, where it is desired to include the whey proteins in the final product, we heat the skim milk above the lactalbumin-coagulation temperature and then cool it somewhat before treating it with rennet. The rennet curd then contains coagulated lactalbumin.

The pressed curd is comminuted to small particle size, suspended in water and stirred, acidified and allowed to settle; the supernatant solution is decanted and the residue resuspended in warm water and the mixture agitated. After settling, the supernatant water is decanted. The resulting residue is a slurry, the solids content of which is approximately 93-97% protein.

If other water-soluble or water-wettable food ingredients are to be added, they may be blended with the protein slurry at this point.

The pH of the slurry or mixture is adjusted to 6.5-9.0 and the mixture heated at below its boiling point for a short time. The hot slurry is then wet-ground through a fine screen and, after readjustment of the pH to 6.3-6.8, if necessary, is roll-dried.

While all of these steps contribute to the production of our new diacasein, certain of them differentiate our process from conventional cheese processes and are essential in imparting the novel and useful properties to diacasein. These steps are:

1. Stirring the comminuted curd in acidified water. This has been found essential to the production of a lyophilic final product that is readily dispersible in water and free of unpleasant odor and taste.

2. Heating the neutralized slurry. This step has been found necessary for the production of a material that can be satisfactorily roll-dried.

3. Wet grinding the thus treated slurry at an elevated temperature and a nearly neutral to slightly alkaline pH value prior to roll drying contributes to the dispersibility in water of the final product.

The coagulation of the casein with rennet, whether or not preceded by heat coagulation of the whey proteins, results in the production of a quick-settling readily washed intermediate material which is particularly well adapted to processing as described.

While we have not determined the mechanism by which these steps have the indicated effects, we have determined by extensive experiments that they are responsible for the desired results and are essential parts of our over-all process.

The conditions under which our process may be operated to give the desired result may be varied within certain ranges.

Rennet is added in an amount from 1.0 to 4.0 oz. per 1000 pounds of milk and at the pH of fresh milk (6.2-7.0) but the range may be 5.8-7.2 at a temperature preferably in the range 86°-120° F. and the enzyme action allowed to proceed until the curd has a satisfactory consistency, usually requiring in the neighborhood of ½ hour. If diacasein containing whey proteins is desired, the step of heat coagulation is preferably carried out at 190° for 30 minutes at the pH of fresh milk, but the range may be 175° F. for 45 minutes to 212° F. for 10 minutes at pH 5.5 to 7.2. After coagulation of the whey proteins, rennet action is much slower, usually about three hours being required to achieve a satisfactory curd consistency. After cutting, the curd is slowly agitated preferably at about 115° F. but the temperature may vary from 98° to 150° F. Washing of the drained curd is advantageously carried out with a spray of cold water. After pressing, the curd may further be worked up immediately or may be stored in the cold say at 32°-50° F. for several weeks. Drying of the curd is not advantageous because of the development of objectionable flavor and odor.

For acid treatment the pressed curd is coarsely comminuted, as for example in a Damrow cheese grinder, to a particle size of $\frac{1}{16}$ to ½ inch. The acidity of the diluted slurry is preferably in the range pH 4.5 to 4.6 but this range may be as great as pH 4.0-5.2 and the amount of dilute acidulated water used is advantageously 200 to 400 gallons per 100 pounds of curd solids. We prefer to use hydrochloric acid but any non-toxic acid or acid salt of sufficient acidity may be used, preferably one having a physiologic anion such as sulfuric, phosphoric, lactic, acetic, citric or the like. The slurry is allowed to stand preferably 1-2 hours but periods as long as 96 hours are satisfactory. Washing after decantation of the acid water is preferably carried out by slurrying with warm water (85°-110° F.), say 200 to 400 gallons per 100 pounds of curd solids, and again decanting. The acid-treating step and subsequent decantation and washing leach out salts and undesirable flavors and odors and the acid treatment, as pointed out above, contributes substantially to the lyophilic character, lack of taste and odor and ready dispersibility in water of the final product and is an essential step if the material is to be roll-dried.

The washed slurry (mixed with other food ingredients if these are added) is neutralized to pH 6.5-7.5 with a fixed base such as potassium hydroxide, potassium carbonate, calcium hydroxide or the like. Ammonium hydroxide to a pH up to 9.0 may also be added if desired for ease of processing. Any free ammonia remaining is eventually driven off in the final drying step.

The heating of the washed and neutralized material may be carried out in a steam jacketed kettle with rapid agitation at about 190° F. for 5-20 minutes although the temperature may range from 185° to 212° F. and the time of heating varied accordingly. Too long and too high heating results in discoloration of the final product and probably some decrease in the biological value of the protein, and too short and too low heating renders the material unsatisfactory for fineness of particle size in the subsequent wet grinding step and will cause coagulation of the material during drying if it is subsequently roll-dried. This heating step conditions the material for subsequent roll drying as the casein up to this step has retained a residual property of coagulation which must be removed before roll drying may be accomplished.

The wet grinding at an elevated temperature of the neutralized heated mixture is advantageously carried out without cooling the heated mixture by grinding it one to three times through a screen with 0.008 to 0.015 inch openings. This operation has the important effect of improving the property of the final product in respect to the formation of a non-settling suspension when it is stirred into water.

Finally, if ammonium hydroxide was not used, a further adjustment of the pH may be made for most desirable taste of the final product; lower pH values, say down to pH 5, may be reached if an acid tasting product is desired.

The roll drying is preferably carried out at atmospheric pressure on any conventional type of roll drier, such as one with a constant feed of slurry and constant discharge of dried product over a doctor blade or scraper. The roll or the drum may be internally steam heated with a preferred temperature in the range of 290°–310° F. with a drying time of 3.0 to 7 seconds, but the temperature range may be as much as 250° to 350° F. and the time varied accordingly. The dried material is ground to a smaller particle size, a 50 mesh screen being most desirable though finer or coarser powders also may be satisfactory for some products.

Spray drying may also be employed. In this case the characteristics of the final product are similar to the roll-dried material in the characteristic of forming a non-settling suspension of partially soluble protein, though the characteristic of rapid wetability is inferior.

Air drying the material by spreading out in thin layers on trays and heating at a temperature of 125°–175° F. may also be used. The dried material in this case may be ground to a small particle size. The characteristics of the air dried ground material in respect to formation of a non-settling suspension and wetability are very similar to these same properties in the roll-dried material.

The final products, diacasein or diacasein plus whey protein (exclusive of added food ingredients), contain the following constituents in the indicated amounts.

|  | Preferred range | Allowable range |
|---|---|---|
| Moisture | 2–4 | 1–8 |
| Protein | 91–93 | 87–96 |
| Fat | 0.5–1.3 | 0.2–2.5 |
| Ash | 4.0–5.0 | 2.3–8.0 |
| Carbohydrate | 0.1 | 0.05–0.2 |
| Sodium (if non-sodium-containing materials used in manufacture) | 0.008–0.016 | 0.005–0.03 |

The differences in properties between our diacasein and typical casein derivatives of the prior art are shown in the following table; the paracasein (rennet casein) and acid casein were prepared by the methods given in "By-products from Milk," by Whittier and Webb, Reinhold, New York (1950); casein was also prepared according to the method described in Atwood et al. Patent 2,320,165. The dry products were passed through a 40 mesh screen and tests made with aqueous mixtures containing 10% solids at pH 6.8 and room temperature.

The accompanying flow sheet, which is self-explanatory, indicates the preferred order of steps. Rectangular panels represent materials and panels with rounded ends represent operations.

The following examples are intended to be exemplary only and not to limit our invention, the scope of which is defined in the appended claims.

*Example 1.*—Four hundred and thirty (430) pounds of skim milk was heated to 190° F. for 30 minutes to coagulate the whey proteins, and then cooled to 86° F. Two (2) ounces of commercial rennet was mixed in to coagulate the casein. After enzyme action had taken place for 105 minutes the curd was cut and the temperature raised to 100° F. with live steam over a period of 20 minutes. The whey was drained off and the curd washed slightly with a spray of cold water. The drained curd was removed and pressed in a cheese press. The yield was 40 pounds of curd containing 12 pounds of total solids, 85% of which are protein.

This material, containing approximately 10 pounds of protein, was coarsely ground and covered with water (30 gallons). Hydrochloric acid was added until the pH of the mixture reached 4.55. After stirring a few minutes the mixture was allowed to stand for one hour and the supernatant removed as completely as possible. Thirty gallons of cold water was added and the mixture stirred for a few minutes. After standing for one hour the supernatant was again siphoned off. The washed material contained 95% protein on a dry basis.

Sufficient water was added to the insoluble material until the total solids content of the mix was 20%. The pH was adjusted with potassium carbonate to a pH value of 6.5 and then further adjusted to pH 7.6 with ammonium hydroxide. The neutralized slurry was then heated to 190° F., held at this temperature for 15 minutes and ground to a homogeneous non-settling suspension by passing once through a Fitzpatrick high speed comminutor fitted with an 0.008 inch mesh screen. It was then dried on a roll dryer at a steam pressure of 40 pounds and a roll speed of 18 R. P. M. The dried flakes were ground to pass a 50 mesh screen. The dried material was almost tasteless and mixed easily with water to form a smooth non-settling suspension.

The product had the following analysis:

| | Per cent |
|---|---|
| Moisture | 4.9 |
| Protein (N×6.38) | 90.2 |
| Fat | 0.9 |
| Sodium | 0.02 |
| Ash | 3.9 |

*Example 2.*—1000 pounds of fresh skim milk was brought to a temperature of 110° F., 2 oz. of rennet was then added, the enzyme was allowed to act for 2 hours and the curd which formed was cut, drained and washed with a spray of water. The weight of curd obtained was 75 pounds. This was placed in cheese hoops and pressed by stacking the cheeses on top of each other. The cheeses were then stored for 2 weeks at 42° F.

*Properties of casein products*

| | Diacasein | Paracasein (Rennet casein) | Casein According to Patent No. 2,320,165 | Acid Casein |
|---|---|---|---|---|
| Ash | 5.5% | 7.4% | 4.6% | 4.7%. |
| Ease of stirring into water | good | good | poor | poor. |
| Solubility of protein (percent) [4] | 48.8 [1] / 58.3 [2] / 65.1 [3] | 6.5% | 95.2% | 95.8%. |
| Taste | slight, not unpleasant | unpleasant, gritty | "glue" sensation unpleasant. | "glue" sensation unpleasant. |
| Odor | do | unpleasant | slight, not unpleasant | slight, not unpleasant. |
| Stability of suspension | did not settle | settled rapidly | Protein was soluble (negligible suspended material). | Protein was soluble (negligible suspended material). |

[1] Material prepared as in Example 2.
[2] Material prepared as in Example 2 except it was air dried.
[3] Material prepared as in Example 1.
[4] Percent of total protein soluble. A 5% suspension of each material at pH 6.8 was shaken mechanically for 3 hours, filtered clear and the protein content of the clear filtrate estimated by the Kjeldahl nitrogen method.

The 75 pounds of cheese was ground through a Damrow cheese grinder and 225 gallons of water added. Hydrochloric acid was added until the pH of the well agitated mix was 4.6. The acidulated water was removed by decantation as completely as possible after 2 hours' standing. 225 gallons of water was added to the precipitate, allowed to stand for one hour and then removed. Finally 50 gallons of water was added.

The pH of the slurry was raised to 6.7 with potassium hydroxide and then to pH 8.5 with ammonium hydroxide. A steam jet was immersed in the mixture and a temperature of 195° F. reached by injection of steam.

The slurry was ground once through a Fitzpatrick comminutor equipped with a 0.015 inch screen and roll dried on a 3 foot drum roll dryer at a steam pressure of 50 pounds and a roll speed of 16 revolutions per minute. The product was then passed through a 40 mesh sieve. The dried material was odorless, almost tasteless and mixed easily with water to form a smooth non-settling suspension.

The product had the following analysis:

|  | Per cent |
|---|---|
| Moisture | 5.4 |
| Protein (N×6.38) | 91.3 |
| Fat | 1.0 |
| Ash | 5.3 |
| Sodium | 0.02 |

*Example 3.*—Skim milk (18,500 lbs.) was heated 186° F. and held at this temperature 30 minutes. The milk was then cooled to 105° F., transferred to a cheese vat and 40 ounces of rennet together with a small amount of calcium chloride were added. After about 3 hours the curd was cut and heated during mild agitation to 115° F. The clear whey was drained off and the curd was rinsed once with a cold water spray. The curd was placed in hoops and pressed by stacking. The yield obtained was 1720 pounds of rennet cheese.

1705 pounds of the cheese cake supplying 483 pounds of protein were shredded through a screen with 5/16" openings and then transferred to a wash tank. The wash tank was filled to 2700 gallons with cold water, the curd was slurried, and the pH of the slurry was adjusted to 4.55. Sufficient agitation to roll the slurry was used. Hydrochloric acid diluted 50–50 with cold water was used for the pH adjustment. The protein sludge was allowed to settle and the acid water decanted.

The tank was again filled to 2700 gallons with water at 90° F. and the slurry was agitated 25 minutes and then after settling occurred the wash was decanted. 150 gallons of water and 13 pounds of potassium carbonate (K$_2$CO$_3$·1½H$_2$O) were added and the slurry heated to 150° F. The pH was 6.8. Hydrolyzed rice flour was prepared by suspending 393.2 pounds of dry rice flour in 200 gallons of cold water, adjusting the pH to 6.0, adding 0.13 pound of diastase H 39 and gradually heating the slurry to 162° F.

The rice flour hydrolysate was then combined with the protein slurry. The mixture was heated to 170° F. and during vigorous agitation 5 pounds of ammonium hydroxide diluted to about 10 gallons with water was added. By continued heating the mixture was brought to a temperature of 190° F. and held 10 minutes. The pH of the mixture was 7.8.

The mixture was cooled to 165° F. and comminuted once through a 50 mesh screen. Compounding was completed by adding 35 pounds of sucrose, 1 pound of magnesium oxide and 24.3 pounds of dicalcium phosphate to the mix. Vitamins and 40 gms. of vanillin were also added.

After cooling the mix to 60° F. it was roll-dried and the dried material passed through a 50 mesh screen. The dried product had a barely perceptible vanilla flavor and odor, and mixed easily with water to form a smooth non-settling suspension. This product is suitable as a dietary supplement in those conditions requiring additional protein with a low sodium intake.

The product had the following analysis:

|  | Per cent |
|---|---|
| Moisture | 4.0 |
| Protein (N×6.38) | 50.0 |
| Carbohydrate (by difference) | 39.2 |
| Fat | 1.0 |
| Ash | 5.8 |
| Including: |  |
| Sodium | 0.02 |
| Calcium | 0.80 |
| Potassium | 0.85 |
| Magnesium | 0.10 |

The steps of our invention need not all be carried out in one place. We may use paracasein which is easily prepared with the usual equipment and personnel of small producers of cheese, which by the further processing at a central location results in a relatively tasteless and odorless protein of high biological value which also has the desirable properties of easy dispersion in water to form a smooth non-settling suspension.

Diacasein prepared from milk not heated before the rennet treatment, i. e. prepared from ordinary paracasein, consists substantially entirely of casein, whereas the diacasein prepared from paracasein made from heated skim milk contains approximately 85% casein and 15% heat coagulable whey protein which agglomerates with the paracasein while it is being rendered insoluble by the rennet. The advantage of the 100% casein product is that it is less expensive to prepare, since preliminary high temperature heating of the milk is omitted. The 85% casein product is obtained in slightly higher yields and is believed to be superior in nutritional quality. Diacasein containing a minor amount of coagulated whey proteins has the same desirable properties of partial solubility and ready dispersibility in water to form slow-settling suspensions as diacasein not containing the whey proteins. Manufacture of the former is illustrated in Example 1, and of the latter in Example 2.

From the above disclosure it will be seen that in diacasein we have provided a new, acceptable and nutritious dietetic protein material, of uniform composition and controlled mineral content, well adapted to incorporate whey proteins and be mixed during its manufacture with other desired dietetic materials. It is particularly suited to furnish high levels of animal protein of excellent biological value to malnourished individuals, to those suffering from injury or shock, or to those requiring a diet of controlled mineral content such as a low-sodium diet. We have also provided a simple and economical process of manufacturing diacasein, certain of the steps of which can be carried out in conventional cheese plant equipment. It will be clear to those skilled in the art that various modifications in process steps may be introduced without sacrifice of the desirable features of our product, and our invention comprises such modifications.

We claim:

1. Diacasein, being a phosphoprotein derived from milk, characterized by being lyophilic in comminuted solid form, easily dispersible in water to form a slow-settling suspension, and having a limited solubility in water such that, when a 5 percent aqueous suspension at pH 6.8 is shaken at room temperature for 3 hours, between about 45 percent and about 65 percent of the diacasein goes into solution.

2. A high-protein dietary constituent consisting essentially of diacasein as defined in claim 1 incorporating a minor amount of whey protein.

3. A dietary constituent adapted to constitute the protein fraction of a low-sodium diet, said constituent being diacasein as defined in claim 1 and containing not over 0.03 percent sodium.

4. A dietary constituent adapted to constitute the protein fraction of a low-sodium diet, said constituent being diacasein incorporating a minor amount of whey protein as defined in claim 2 and containing not over 0.03 percent sodium.

5. A substantially sodium-free, low-fat, therapeutic food product consisting essentially of a mixture of diacasein as defined in claim 3 with vitamins, sodium-free minerals and sodium-free comestibles selected from the class consisting of cereals, carbohydrates and mixtures thereof.

6. A substantially sodium-free, low-fat, therapeutic food product consisting essentially of a mixture of diacasein incorporating a minor amount of whey protein as defined in claim 4 with vitamins, sodium-free minerals and sodium-free comestibles selected from the class consisting of cereals, carbohydrates and mixtures thereof.

7. The process of producing diacasein which comprises preparing a pressed curd of paracasein and, before permitting the curd to dry, submitting it to the following treatment: comminuting the curd, digesting it in a dilute aqueous solution of a non-toxic acid at a pH of 4.0–5.2, decanting the acid liquid from the curd, washing the curd with water, separating the wash water, neutralizing the residual slurry, heating the neutralized slurry to an elevated temperature below its boiling point, grinding the slurry while still at an elevated temperature, and drying the ground slurry to form a solid lyophilic material.

8. The process as defined in claim 7 in which the pressed curd of paracasein incorporates a minor amount of whey protein.

9. The process of producing diacasein which comprises: treating skim milk with rennet at a pH and at an elevated temperature at which rennet is active to form a paracasein curd, cutting the curd, draining and washing the curd, pressing the curd, coarsely grinding the pressed curd without permitting it to dry, suspending the ground curd in water, acidifying the water to a pH in the range 4.0–5.2 with an acid substance containing an anion selected from the class consisting of chloride, sulfate, phosphate, lactate, acetate and citrate anions, agitating the curd in the acidified water, decanting the acid water, washing the curd and decanting the wash water, suspending the washed curd in water, adjusting the pH of the suspension to a value in the range 6.5–7.5 by the addition of a fixed base free of sodium, further raising the pH to a value not above 9.0 by adding ammonium hydroxide, agitating and heating the resulting slurry at a temperature in the range 185°–212° F., wet-grinding the slurry while still at an elevated temperature through a fine screen having openings with diameters of the order of 0.008–0.015 inch, rapidly drying the slurry at a non-destructive temperature to a moisture content in the range 1–8 percent, and grinding the dried product to produce a high-protein, low-sodium, free-flowing powder, readily dispersible in water to form a slow-settling dispersion devoid of noxious taste and odor.

10. A process as defined in claim 9 in which the skim milk, before rennet treatment, is heated at 175°–212° F. for 45–10 minutes, the lower temperatures being for the longer times, and is then cooled to a temperature at which rennet is active.

References Cited in the file of this patent

UNITED STATES PATENTS

| Number | Name | Date |
|---|---|---|
| 2,006,699 | Supplee et al. | July 2, 1935 |
| 2,034,056 | Peebles | Mar. 17, 1936 |
| 2,209,694 | Harford | July 30, 1940 |
| 2,225,506 | Otting | Dec. 17, 1940 |
| 2,547,136 | Oberg et al. | Apr. 3, 1951 |